(12) United States Patent
Alvandpour et al.

(10) Patent No.: US 6,353,342 B1
(45) Date of Patent: Mar. 5, 2002

(54) INTEGRATED CIRCUIT BUS ARCHITECTURE INCLUDING A FULL-SWING, CLOCKED, COMMON-GATE RECEIVER FOR FAST ON-CHIP SIGNAL TRANSMISSION

(75) Inventors: Atila Alvandpour; Soumyanath Krishnamurthy, both of Portland; Ram K. Krishnamurthy, Beaverton, all of OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/702,121

(22) Filed: Oct. 30, 2000

(51) Int. Cl.[7] .................................................. G11C 7/06
(52) U.S. Cl. ......................................... 327/51; 327/208
(58) Field of Search ........................... 327/51, 57, 208, 327/210–213, 218; 326/56, 58

(56) References Cited

U.S. PATENT DOCUMENTS

| | | | | |
|---|---|---|---|---|
| 5,426,385 A | * | 6/1995 | Lai | 327/51 |
| 5,917,355 A | * | 6/1999 | Klass | 327/210 |
| 5,999,022 A | * | 12/1999 | Iwata et al. | 327/211 |
| 6,121,807 A | * | 9/2000 | Klass et al. | 327/210 |

\* cited by examiner

Primary Examiner—Toan Tran
(74) Attorney, Agent, or Firm—Schwegman, Lundberg, Woessner & Kluth, P.A.

(57) ABSTRACT

An integrated circuit (IC) bus architecture is disclosed. The bus architecture includes a receiver for fast on-chip signal transmission. The receiver includes a first gate device having one terminal connected to a voltage source and a gate terminal connectable to receive a sense signal. A second gate device includes one terminal connected to another terminal of the first gate device, a gate terminal connectable to receive the sense signal and another terminal serving as an input terminal of the receiver and connectable to an interconnect bus to receive input signals from other components on the IC chip. The receiver also includes a third gate device having one terminal connected to a voltage source and another terminal serving as an output terminal of the receiver and connected to the other terminal of the first gate device. The receiver further includes an inverter having an input terminal connected to the output of the receiver and having an output terminal connected to a gate terminal of the third gate device. The input of the receiver is capable of being pre-discharged to a low signal and the output of the receiver is capable of being pre-charged to a high signal for substantially instantaneous transmission of input signals received by the receiver.

34 Claims, 4 Drawing Sheets

INTEGRATED CIRCUIT BUS ARCHITECTURE INCLUDING A FULL-SWING, CLOCKED, COMMON-GATE RECEIVER FOR FAST ON-CHIP SIGNAL TRANSMISSION

FIELD OF THE INVENTION

The present invention relates generally to integrated circuits, and more particularly to an integrated circuit (IC) bus architecture including a full-swing, clocked, common-gate receiver for fast on-chip signal transmission for application particularly in very large scale integrated circuits (VLSICs), such as microprocessors and the like.

BACKGROUND INFORMATION

Ever increasing performance demands are being placed on computer circuits, microprocessors and other ICs and VLSICs. ICs and VLSICs are being required to operate at continually increasing clock speeds. More components are being placed on an IC to perform more functions at faster speeds. Component layouts often require that components that need to share information or communicate with one another cannot be located proximal to one another resulting in transmission time delays. This problem is exacerbated by VLSI circuits where signal propagation delays due to long interconnections are increasingly dominating the overall performance of these devices.

One known bus arrangement 100 for on-chip signal transmission is shown in FIG. 1. The bus arrangement 100 includes a static CMOS inverter 102 as a receiver. The inverter 102 is connected to a driver circuit 104 by a circuit interconnect line 106. The driver circuit 104 includes a first N-channel metal oxide semiconductor 108 (NMOS) transistor with one terminal connected to ground and a second terminal connected to a terminal of a second NMOS transistor 110. A third P-channel (PMOS) transistor 112 is connected by one terminal to another terminal of the second transistor 110 and to an input of an inverter 114. The other terminal of the third transistor 112 is connected to Vcc or a supply voltage. The gates of the first NMOS transistor 108 and the third PMOS transistor 112 are connected to a system clock (CLK) and the gate of the second NMOS transistor 110 is connectable to receive an input signal (IN). The output of the inverter 114 is connected to the circuit interconnect line 106. The circuit interconnect line 106 is typically a long, distributed resistive/capacitive (RC) line 106.

Another known bus arrangement 200 for on-chip signal transmission is shown in FIG. 2. The bus arrangement 200 includes a driver circuit 202 similar to that just described with respect to FIG. 1. The driver circuit 202 is coupled to a receiver 204 by a distributed RC line 206. The receiver 204 may be a dynamic inverter with a low trip point. Because the receiver 204 has a lower trip point than the bus arrangement 100 of FIG. 1, the bus arrangement 200 will operate at somewhat faster speeds. The bus arrangement 200, however, does not have the ability to recover data. If for any reason a wrong or false data input signal is sensed by the receiver 204 because of coupling noise or supply voltage noise, there is no ability for data recovery by the receiver 204 to sense a correct or true data input signal. For example, during the evaluation period CLK 2 is high and the input to the receiver 204 is low and should remain low. If some coupling noise or supply voltage noise increases the voltage level at the input to the receiver 204 temporarily such that the receiver 204 senses an erroneous or false high input signal, the receiver 204 will be unable to recover and respond to a correct data input, such as a true low input signal, even if the input returns to a low state during the evaluation period (CLK 2 is high).

FIG. 3 shows another known receiver 300 for use in a bus arrangement for on-chip signal transmission. This receiver 300, however, requires differential input signals at the differential inputs 302 and 304 (IN and IN #). Additionally, the receiver 300 has two clock inputs 306 and 308 (CLK), a sense input 310 (SI) that may be a function of the system clock, and differential outputs 312 and 314 (OUT and OUT #). The differential inputs 302 and 304 of the receiver 300 are coupled to interconnects 316 and 318 that are typically long RC lines interconnecting the receiver 300 with other chip components with which the receiver 300 communicates. The receiver 300 therefore requires multiple interconnect lines to other on-chip components and has a rather complex circuit topology. The multiple interconnect lines and the complex circuit topology requires that the receiver 300 occupy a substantially larger portion of vital real estate on a chip and will have a higher power consumption compared to the less complex circuitry of the bus arrangements 100 and 200 in FIGS. 1 and 2.

While the bus arrangement or receiver 300 of FIG. 3 has a much more complex circuit topology compared to the bus arrangements 100 and 200 of FIGS. 1 and 2, the bus arrangement 300 will respond well to small input voltages and provides faster operation and better performance.

The receiver 300, however, also suffers from the ability to recover data after a false input signal. If for any reason a wrong or erroneous data input is sensed by the receiver 300 during an evaluation period, such as an erroneous signal resulting from coupling noise or supply voltage noise, the receiver 300 will have difficulty or be unable to recover or reset to sense a correct or true data input during the same evaluation period. This is because the receiver 300 has a latching action. For example, during a pre-charge time or period (CLK is low and S1 is low), the inputs 302 and 304 are pre-charged to a high state along with the outputs 312 and 314. During the evaluation time or sensing period (CLK is high and S1 is high), an erroneous signal may result in one of the outputs 312 or 314 being sensed and latched to a low state while the other output 312 or 314 remains latched to a high state. Hence if the sensed output 312 or 314 is incorrect, there will be no way for the receiver 300 to recover or reset to sense the correct or true data as the receiver 300 is latched independently of the signals on the inputs 302 and 304.

Accordingly, for the reason stated above, and for other reasons that will become apparent upon reading and understanding the present specification, there is a need for an integrated circuit bus architecture including a receiver for faster on-chip signal transmission than has been previously achievable and that has the ability to recover after a false or erroneous input signal. Additionally, a need exists for a receiver that is single-ended, not requiring differential signals and hence requiring less interconnect routing and consumes less power, and for a receiver that can respond to small input voltages developed at the interconnect or input to the receiver to provide fast conversions or transitions and thereby reduce interconnect-delay of the total bus delay. A need further exists for a receiver that has a simple circuit topology and that requires less design effort.

DESCRIPTION OF THE EMBODIMENTS

In the following detailed description of the preferred embodiments, reference is made to the accompanying drawings which form a part hereof, and in which is shown by way of illustration specific embodiments in which the invention may be practiced. It is to be understood that other embodiments may be utilized and structural changes may be made without departing from the scope of the present invention.

Figure 1:
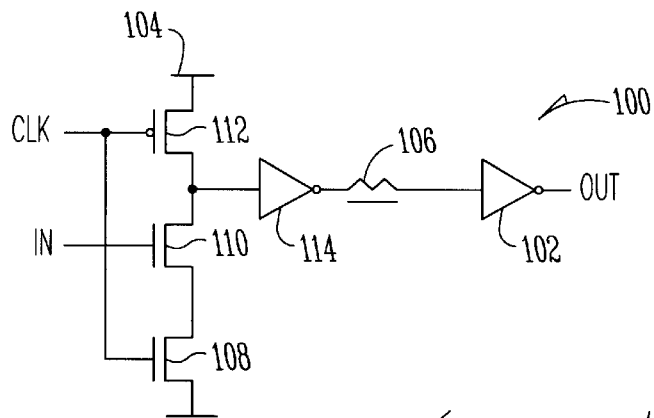
FIG. 1 is a schematic diagram of a known bus or interconnect arrangement including a receiver for on-chip signal transmission.
Figure 2:
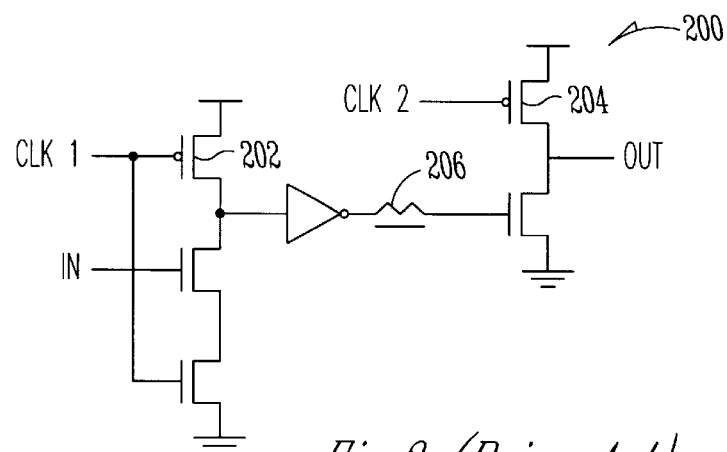
FIG. 2 is schematic diagram of another known bus or interconnect arrangement including a receiver for on-chip signal transmission.
Figure 3:
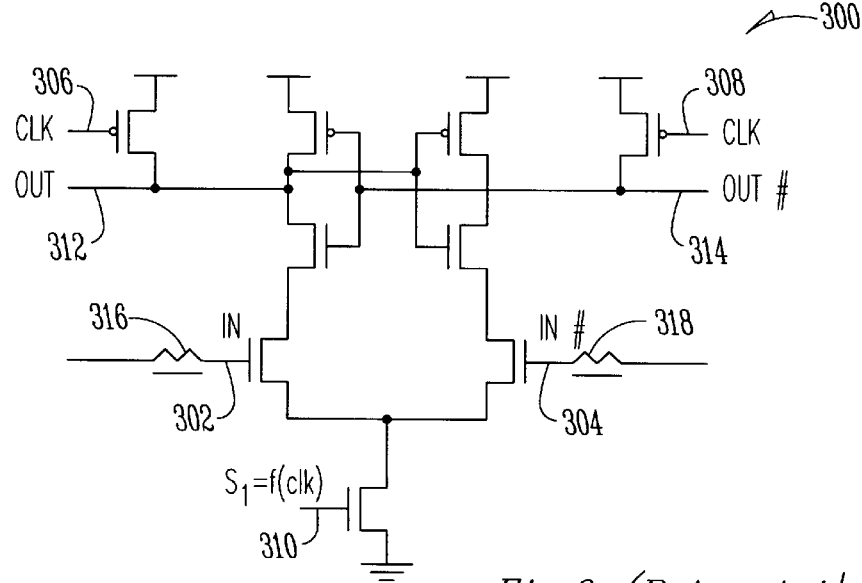
FIG. 3 is a schematic diagram of a known receiver for on-chip signal transmission.
Figure 4:
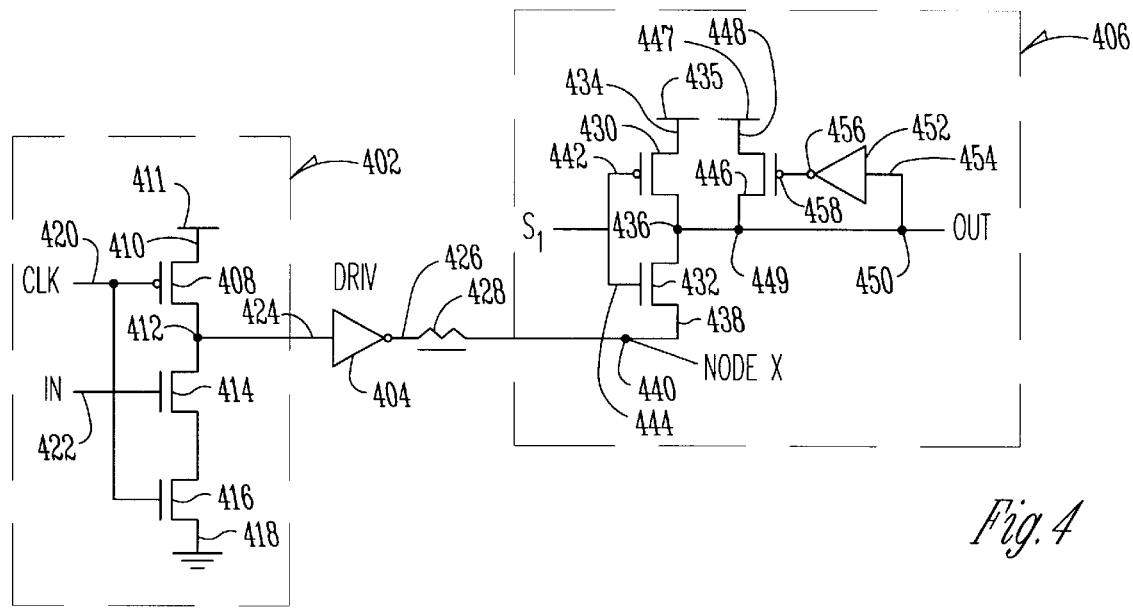
FIG. 4 is a schematic diagram of an integrated circuit bus architecture including a receiver for fast on-chip signal transmission in accordance with the present invention.

Referring initially to FIG. 4, a bus architecture 400 in accordance with at least one embodiment of the present invention is shown. The bus architecture 400 includes a dynamic inverter 402, a driver circuit 404 and a receiver 406. The dynamic inverter 402 includes a first P-channel metal oxide semiconductor (PMOS) transistor 408 with one lead or terminal 410 electrically connected to a supply voltage 411 or potential difference relative to ground and another lead or terminal 412 electrically connected in series to a second N-channel metal oxide semiconductor (NMOS) transistor 414. The second NMOS transistor 414 is electrically connected in series to a third NMOS transistor 416. The third NMOS transistor 416 has one terminal 418 connected to ground. The first PMOS transistor 408 and the third NMOS transistor 416 have a common gate terminal 420 connected to a system clock (CLK). The second NMOS transistor 414 has a gate terminal 422 connectable to receive an input signal (IN).

The driver circuit 404 is preferably a static CMOS inverter and has a input 424 electrically connected to the terminal 412 of the first PMOS transistor 408. The driver 404 has an output 426 connected to a resistive/capacitive (RC) interconnect line 428.

The receiver 406 includes a pair of complementary gated semiconductor devices 430 and 432. For example, the first gated semiconductor device 430 may be a PMOS transistor or the like and the second gated semiconductor device 432 may be an NMOS transistor or the like to form a CMOS transistor pair 430 and 432. A first terminal (or source terminal) 434 of the first gated device 430 is connected to a supply voltage or voltage source 435 and the second terminal (or drain terminal) 436 is connected to a first terminal (or a source terminal), also 436, of the second gated device 432 at a node, also labeled as 436 in FIG. 4. A second terminal (or drain terminal) 438 of the second gated device 432 is connected to an input 440 of the receiver 406 also labeled as Node X in FIG. 4. The gate terminals 442 and 444 of the first and second gated devices 430 and 432, respectively, are connected in common to receive a sense signal ($S_1$). The receiver 406 also includes a third gated device 446 having a first terminal 448 (or source terminal) connected to a voltage source 447 and a second terminal 449 connected to an output 450 of the receiver 406. The supply voltage or voltage sources 411, 435 and 447 may all be the same supply voltage or voltage source or may be different voltages derived from a system supply voltage or from an alternative voltage source (not shown) depending upon the system design and requirements. The second terminal 449 is also connected to the first and second gated devices 430 and 432 at the node 436. The third gated device 446 may be a PMOS transistor or the like.

The receiver 406 further includes an inverter 452 having an input terminal 454 connected to the receiver output 450 and an output terminal 456 connected to a gate terminal 458 of the third gate device 446.

The bus arrangement 400 and receiver 406 thus require only a single interconnect which results in much less area being occupied on the chip for interconnect routing and also less power consumption compared to other known receivers and bus arrangements. Additionally, the receiver 406 of the present invention can always recover from false or erroneous input signals caused by coupling noise, supply voltage noise or the like because the input 440 is statically connected to the output 450 of the receiver 406 through the pass transistor or second gated device 432. The receiver 406 also responds quickly to small input voltages and therefore provides fast operation and good performance as will be described in more detail below.

The operation of the bus architecture 400 shown in FIG. 4 will be described with reference to FIG. 5 which is a graph of the waveforms of different signals associated with the bus architecture 400. The first signal waveform 502 illustrates a system clock (CLK) signal that is applied to or received by the common gate terminal 420 of the first PMOS transistor 408 and third NMOS transistor 416. The second signal waveform is a sense signal ($S_1$) 504 that is applied to or received by the common gates 442 and 444 of the complementary MOS (CMOS) transistors 430 and 432 of the receiver 406. The sense signal 504 in its simplest form may be a derivative of the CLK 502 delayed a predetermined time period. The next signal waveform is the signal appearing at Node X or the input signal 506 to the input 440 of the receiver 406. An input signal (IN) to the dynamic inverter 402 is not shown in FIG. 5 because the input signal 506 to the receiver 406 is primarily of interest in the operation of the invention. The final waveform signal in FIG. 5 is the Output signal (OUT) 508 that will appear at the output 450 of the receiver 406.

Figure 5:
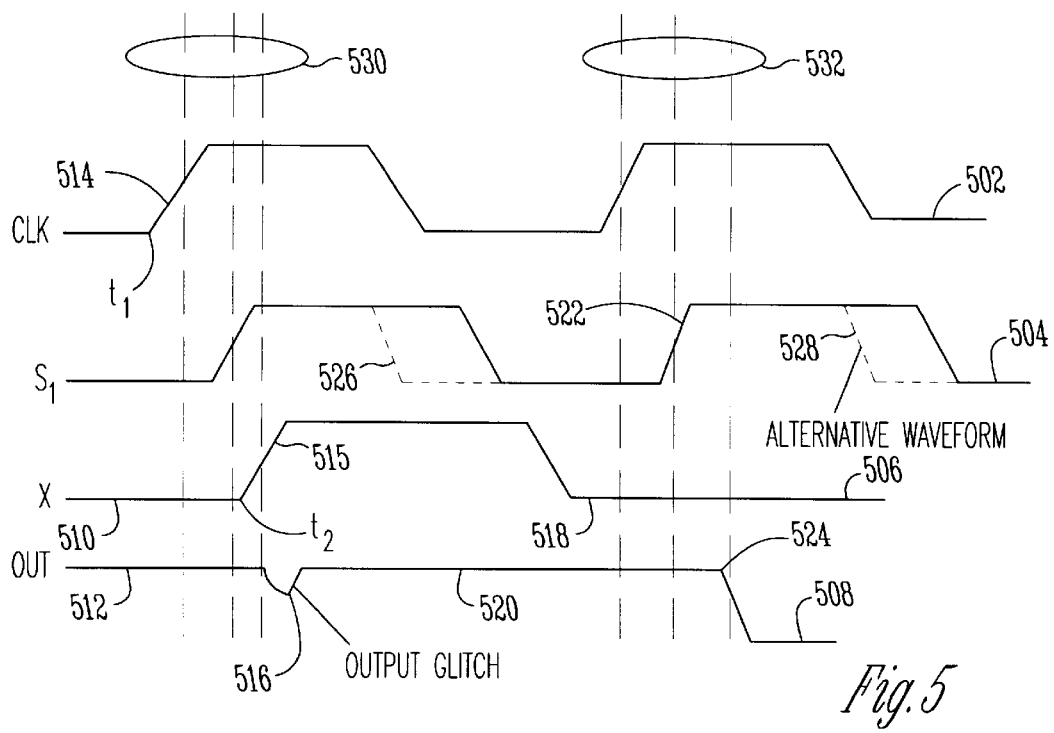
FIG. 5 is a graph of different signals illustrating the operation of the bus architecture of FIG. 4.

In accordance with the present invention, a predetermined signal may be applied to the bus architecture 400 to selectively pre-discharge the input 440 to the receiver 406 at Node X to a logic low signal level, as shown by reference numeral 510 on waveform 506 in FIG. 5. Similarly, another predetermined signal may be applied to the bus architecture 400 to selectively pre-charge the output 450 of the receiver 406 to a logic high signal level, as shown by reference numeral 512 on waveform 508 in FIG. 5. The inverter 452 and PMOS gate device 446 in the feedback loop from the output 450 serve to maintain or keep the output 450 at the logic high level 512 until the CMOS transistor devices 430 and 432 are activated by the sense signal 504 to transmit a signal from the input 440 to the output 450 of the receiver 406.

At a time $t_1$ the system clock signal 502 will transition to a logic high state 514 and an input signal present at the input to the dynamic inverter 402 will be gated or passed through the dynamic inverter 402 and inverted by the driver 404. The input signal will then be transmitted over the distributed RC interconnect line 428 and as a result of inherent time delays in the dynamic inverter 402, driver 404 and particularly the RC interconnect line 428, the signal begins to arrive and develop at the input 440 to the receiver 406 (Node X) at some later time $t_2$, as shown on the signal waveform 506. If the input signal is making a transition from a logic low level to a logic high level, the waveform of the signal 506 will begin to make a transition from the logic low to the logic high, as illustrated by reference numeral 515 in FIG. 5. The sense signal ($S_1$) 504 is intentionally delayed a predetermined time period to permit the signal 506 to at least partially develop at the input 440 to the receiver 406. However, before the signal 506 needs to fully arrive or develop, the sense signal ($S_1$) 504 will activate or turn on the receiver 406 to permit the input signal 506 at the receiver input 440 to be transmitted to the output 450 of the receiver 406. The signal propagation delay through the receiver 406 is substantially instantaneous or virtually zero because the output 450 has been pre-charged to the logic high state 512. The actual arrival of the leading edge of the signal 506 at the output 450 will cause a small output glitch 516 to occur in the output signal 508. The small glitch 516 does not lead to any false operation because of the bus 400 design. The output 450 of the receiver 406 very quickly goes to a logic high as the signal 506 at Node X is driven statically by the CMOS inverter driver 404 and the signal 508 will reach full swing and the glitch 516 is thus recovered. After receiving and transmitting the signal 506 through the receiver 406, the input 440 of the receiver 406 at Node X may then be dis-charged to a logic low 518 and the output 450 of the receiver pre-charged to a logic high 520 or will remain at a logic high if the last signal 506 transmitted through the receiver 406 was a high as in the example just discussed.

In an example where the input signal 506 is a logic low and thus the signal 506 at Node X or the input 440 to the receiver 406 remains low, the receiver 406 will be activated or turned on when the sense signal ($S_1$) 504 makes a transition to a logic high 522. Because the input 440 of the receiver 406 is pre-discharged to a logic low and the signal 506 is already stable at the input 440, the signal propagation delay through the receiver 406 is virtually zero and the output signal 508 begins to make a substantially instantaneous transition to a logic low 524.

As shown by the broken lines 526 and 528 in FIG. 5 which illustrate an alternative waveform for the sense signal, a full pulse width is not required for proper operation of the receiver 406. Additionally, the vertical broken lines 530 and 532 are included to illustrate the relative time delay between the different signals.

Figure 6:
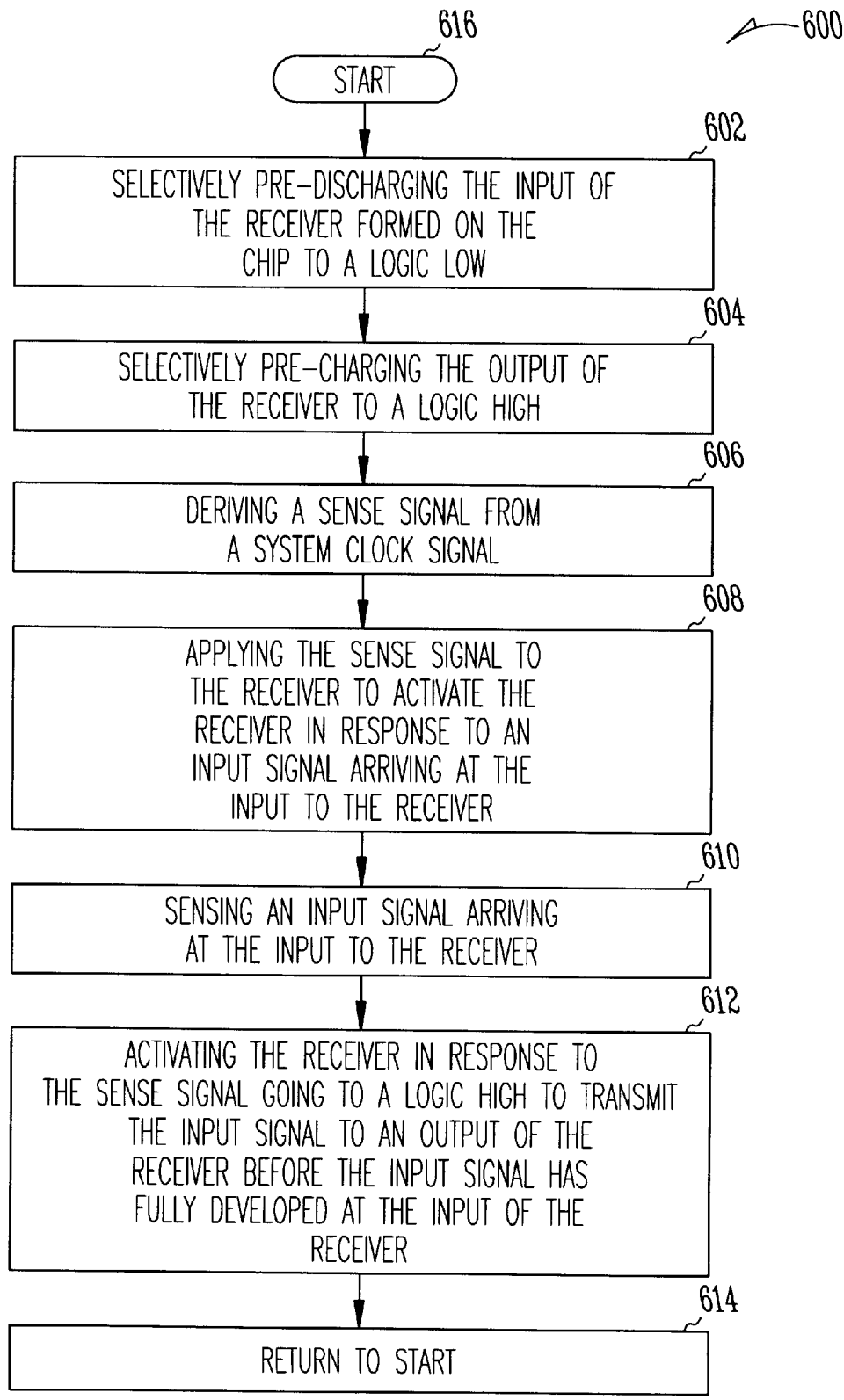
FIG. 6 is a flow chart of a method for fast on-chip signal transmission in accordance with the present invention.

FIG. 6 is a flow chart of a method 600 for fast on-chip signal transmission in accordance with a further embodiment of the present invention. In the action box 602, the input 440 of the receiver 406 is selectively pre-discharged to a logic low. In action box 604, the output 450 of the receiver 406 is selectively pre-charged to a logic high. Predetermined signals may be applied to the bus architecture 400 to selectively pre-discharge the input 440 and pre-charge the output 550 of the receiver 406. The sense signal ($S_1$) 504 is derived from the system clock (CLK) 502 in action box 606 and in action box 608, the sense signal 504 is applied to the receiver 406 to active the receiver 406 in response to an input signal 506 arriving or beginning to develop at the input 440 of the receiver 406. In action box 610, an input signal 506 is sensed at the input 440 of the receiver 406 and in action box 612, the receiver 406 is activated by the sense signal ($S_1$) 504 going to a logic high to gate or transmit the input signal 506 through the receiver 406 to the output 450 before the input signal 506 is fully developed at the input 440. In action box 614, the method returns to the start 616 and the process is repeated for the next input signal 506.

Figure 7:
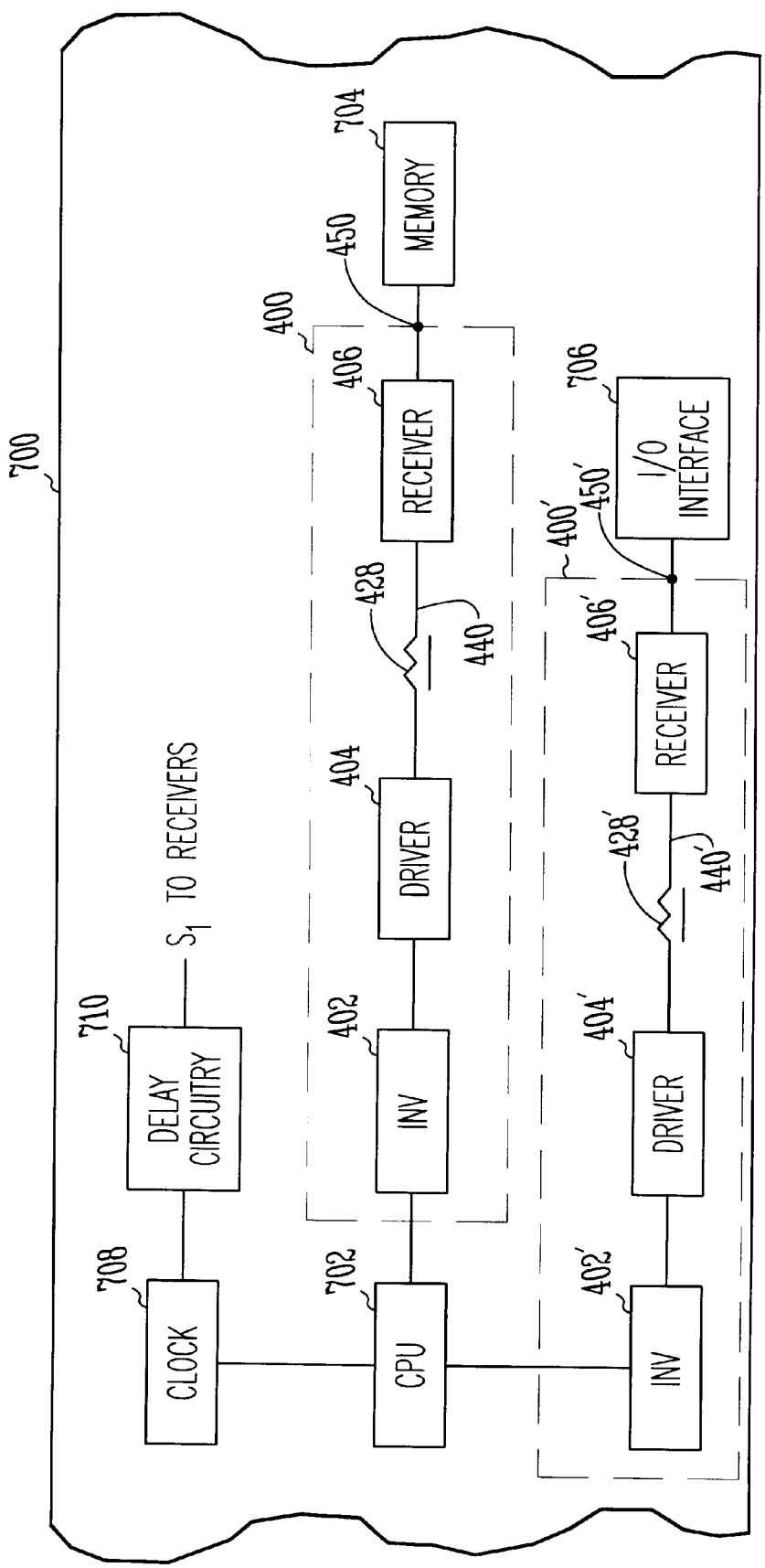
FIG. 7 is a schematic diagram of a portion of a VLSIC showing one example of an application the bus architecture and receiver in accordance with the present invention.

FIG. 7 illustrates one example of an application of the bus architecture 400 of the present invention. FIG. 7 shows a portion of a VLSIC 700, such as a microprocessor or the like. In the example shown, the bus architecture 400 of the present invention is used to transmit information or data from one component on the VLSIC 700, such as a CPU 702, to another component on the VLSIC 700, such as a memory circuit or device 704, input/output interface 706 or other component. In the example shown, the VLSIC 700 includes a system clock 708 connected to the central processing unit 702. The system clock 708 may be connected to delay circuitry 710 to derive the sense signal $S_1$ for application to the receivers 406 and 406'. Two identical examples of the bus architecture 400 are shown in FIG. 7. One bus architecture 400 connects the CPU 702 to the memory device 704 and the other bus architecture 400' connects the CPU 702 to the input/output (I/O) interface 706. In each example, the CPU 702 is connected to the inverter 402/402' and the inverter 402/402' is connected to the driver 404/404' similar to that described with reference to FIG. 4. The driver 404/404' is then connected to the long distributed RC interconnect line 428/428'. The interconnect line 428/428' is connected to the input 440/440' of the receiver 406/406' and the output 450/450' of the receiver 406/406' is connected to the memory device 704 or the input/output (I/O) interface 706 as shown in the examples of FIG. 7.

While the CPU 702 is shown connected to the memory device 704 and the I/O interface 706 in FIG. 7, the bus structure 400/400' and the receiver 406/406' may be used to connect any two components on a VLSIC or other devices that need to communicate with one another for proper operation of the VLSIC or devices. Additionally, the receiver 406/406' may be used by itself or in combination with other bus structures than those specifically shown and described herein to provide fast on-chip signal transmission between different components on a VLSIC or the like.

Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention. Therefore, it is intended that this invention be limited only by the claims and the equivalents thereof.

What is claimed is:

1. An integrated circuit bus architecture, comprising:
   a receiver, comprising:
      a complementary metal oxide semiconductor (CMOS) transistor pair, a first terminal of a first transistor of the pair being connected to a voltage source and a second terminal being connected to a first terminal of a second transistor of the pair at a node and a second terminal of the second transistor being connected to an input of the receiver;
      a third MOS transistor having a first terminal connected to the voltage source and a second terminal connected to an output of the receiver and to the first transistor and the second transistor at the node; and
      an inverter connected at an input to the output of the receiver and an output of the inverter being connected to a gate terminal of the third MOS transistor.

2. The bus architecture of claim 1, further comprising:
   a driver circuit connected to the input of the receiver by a distributed resistive/capacitive (RC) line.

3. The bus architecture of claim 2, wherein the driver circuit comprises a full-swing CMOS inverter to statically drive the receiver.

4. The bus architecture of claim 2, further comprising a dynamic inverter connected to an input of the driver circuit.

5. The bus architecture of claim 4, wherein the dynamic inverter comprises:
   a first P-channel (PMOS) transistor having one terminal connected to the voltage source and a gate terminal connectable to a system clock;
   a second N-channel (NMOS) transistor having one terminal connected to another terminal of the first PMOS transistor and to the input to the driver circuit and a gate terminal connectable to receive an input signal; and
   a third N-channel (NMOS) transistor having one terminal connected to another terminal of the second NMOS transistor, a gate terminal connectable to the system clock and another terminal connected to ground.

6. The bus architecture of claim 1, wherein the gates of the CMOS transistor pair are each connectable to receive a sense signal.

7. The bus architecture of claim 6, wherein the sense signal is derived from a system clock signal and is delayed a predetermined time period to permit an input signal to at least partially develop at the input to the receiver before activating the CMOS transistor pair for transmission of the input signal to an output of the receiver.

8. The bus architecture of claim 7, wherein the sense signal goes high to activate the CMOS transistor pair in response to a potential low-to-high data signal partially developing at the input to the receiver.

9. The bus architecture of claim 1, wherein the input to the receiver is pre-discharged to a low signal; and
   wherein the output of the receiver is pre-charged to a high signal to provide substantially instantaneous transmission of a signal from the input to the output of the receiver.

10. The bus architecture of claim 9, wherein an output transition time and a signal propagation delay through the receiver are substantially zero in response to a low-to-high signal transition at the input to the receiver if the output of the receiver is pre-charged to the high signal and in response to the input signal remaining low if the input signal is stable as a result of the input to the receiver being pre-discharged to a low signal and the output of the receiver will transition to a low signal at a faster rate than if the input to the receiver had not been pre-discharged to the low signal.

11. A receiver for fast on-chip signal transmission, comprising:
   a first gate device including one terminal connected to a voltage source and a gate terminal connectable to receive a sense signal;
   a second gate device including one terminal connected to another terminal of the first gate device, a gate terminal connectable to receive the sense signal and another terminal serving as an input terminal of the receiver and connectable to a bus to receive input signals;
   a third gate device including one terminal connected to the voltage source and another terminal serving as an output terminal of the receiver and connected to the other terminal of the first gate device; and
   an inverter including an input terminal connected to the output of the receiver and an output terminal connected to a gate terminal of the third gate device.

12. The receiver of claim 11, wherein the input to the receiver is pre-discharged to a low signal; and
   wherein the output of the receiver is pre-charged to a high signal to provide substantially instantaneous transmission of a signal from the input to the output of the receiver.

13. The receiver of claim 11, wherein the first gate device and the second gate device are complementary devices.

14. The receiver of claim 11, wherein the sense signal is derived from a system clock and is delayed a predetermined time period to permit an input signal at the input to the receiver to at least partially develop before activating the receiver for transmission of the input signal.

15. The receiver of claim 11, wherein the sense signal goes high to activate the receiver in response to a potential low-to-high signal partially being developed at the input to the receiver.

16. The receiver of claim 11, wherein an output transition time and a signal propagation delay through the receiver are substantially zero in response to a low-to-high signal transition at the input to the receiver with the output of the receiver being pre-charged to the high signal and in response to the input signal remaining low with the input signal being stable as a result of the input to the receiver being pre-discharged to the low signal and the output to the receiver will transition to a low signal at a faster rate than if the input to the receiver had not been pre-discharged to the low signal.

17. The receiver of claim 11, wherein the other terminal of the second gate device is connected to a driver circuit by a distributed RC line.

18. The receiver of claim 17, wherein the driver circuit comprises a full-swing CMOS inverter to statically drive the receiver.

19. A method of fast on-chip signal transmission, comprising:
   pre-discharging an input to a receiver formed on the chip to a low signal;
   pre-charging an output to the receiver to a high signal;
   sensing an input signal arriving at the input to the receiver; and
   activating the receiver in response to sensing the input signal to transmit the input signal to an output of the receiver before the input signal has fully developed at the input to the receiver.

20. The method of claim 19, wherein sensing an input signal comprises deriving a sense signal from a system clock.

21. The method of claim 19, wherein a low to high signal transition being received at the input to the receiver is substantially instantaneously transmitted to the output of the receiver when the receiver is activated as a result of the output of the receiver being pre-charged to a high signal.

22. The method of claim 19, wherein a low signal being received at an input to the receiver is substantially instantaneously transmitted to the output of the receiver when the receiver is activated as a result of the input of the receiver being pre-discharged to a low signal.

23. The method of claim 19, further comprising providing a single-ended, clocked receiver.

24. The method of claim 19, further comprising coupling a pass transistor between the input and the output of the receiver to permit data recovery in the event of a false input signal.

25. A integrated circuit (IC), comprising:
   a first component formed on the IC;
   at least one second component formed on the IC; and
   a bus architecture connected between the first component and the at least one second component for the transmission of signals between the first component and the at least one second component, the bus architecture comprising a receiver, wherein the receiver includes:

a first gate device including one terminal connected to a voltage source and a gate terminal connectable to receive a sense signal; and a second gate device including one terminal connected to another terminal of the first gate device, a gate terminal connectable to receive the sense signal and another terminal serving as an input terminal of the receiver and connectable to receive input signals.

26. The IC of claim 25, wherein an input to the receiver is pre-discharged to a low signal; and wherein an output of the receiver is pre-charged to a high signal to provide substantially instantaneous transmission of a signal from the input to the output of the receiver.

27. The IC of claim 25, wherein the receiver comprises:

a third gate device including one terminal connected to a voltage source and another terminal serving as an output terminal of the receiver and connected to the other terminal of the first gate device; and an inverter including an input terminal connected to the output of the receiver and an output terminal connected to a gate terminal of the third gate device.

28. The IC of claim 27, wherein the first gate device and the second gate device are complementary devices.

29. The IC of claim 27, wherein the sense signal is derived from a system clock and is delayed a predetermined time period to permit an input signal at the input to the receiver to at least partially develop before activating the receiver for transmission of the input signal.

30. The IC of claim 27, wherein the sense signal goes high to activate the receiver in response to a potential low-to-high signal partially being developed at the input to the receiver and a low-to-remaining low signal arriving at the input to the receiver.

31. The IC of claim 27, wherein an output transition time and a signal propagation delay through the receiver are substantially zero in response to a low-to-high signal transition at the input to the receiver with the output of the receiver being pre-charged to a high signal and in response to the input signal remaining low with the input signal being stable as a result of the input of the receiver being pre-discharged to a low signal and the output to the receiver will transition to a low signal at a faster rate than if the input to the receiver had not been pre-discharged to the low signal.

32. The IC of claim 27, further comprising a driver circuit connected to the receiver by a distributed RC interconnect line.

33. The IC of claim 32, wherein the driver circuit comprises a full-swing CMOS inverter to statically drive the receiver.

34. The IC of claim 25, wherein the second gate device comprises a pass transistor coupled between an input and an output of the receiver to provide data recovery in the event of a false input signal.

* * * * *